United States Patent
Anand et al.

(10) Patent No.: US 8,120,886 B2
(45) Date of Patent: *Feb. 21, 2012

(54) CIRCUIT BREAKER CLOSING ACTUATOR AND METHOD OF OPERATION

(75) Inventors: Pradeep Kumar Anand, Hyderabad (IN); Geoffrey Freeman Butland, Farmington, CT (US); Rajani Karra, Hyderabad (IN)

(73) Assignee: General Electric Company, Schenectady, NY (US)

( * ) Notice: Subject to any disclaimer, the term of this patent is extended or adjusted under 35 U.S.C. 154(b) by 786 days.

This patent is subject to a terminal disclaimer.

(21) Appl. No.: 12/204,155

(22) Filed: Sep. 4, 2008

(65) Prior Publication Data

US 2010/0052829 A1 Mar. 4, 2010

(51) Int. Cl.
*H02H 7/00* (2006.01)

(52) U.S. Cl. .................................... 361/93.2

(58) Field of Classification Search ............... 361/93.1, 361/93.2
See application file for complete search history.

(56) References Cited

U.S. PATENT DOCUMENTS

| | | | | |
|---|---|---|---|---|
| 5,311,392 | A * | 5/1994 | Kinney et al. | 361/93.2 |
| 6,611,411 | B2 * | 8/2003 | Williams et al. | 361/93.1 |
| 6,999,291 | B2 * | 2/2006 | Andarawis et al. | 361/64 |

* cited by examiner

*Primary Examiner* — Stephen W Jackson
(74) *Attorney, Agent, or Firm* — Cantor Colburn LLP

(57) ABSTRACT

A circuit breaker closing actuator and a method of operation is provided. The closing actuator is disposed to communicate and receive signals from a trip unit. The trip unit includes a communications to transmit and receive data and signals from a remote location. The trip unit transmits a signal to the closing actuator in response to receiving a closing signal from the remote location. The closing actuator validates the signal and activates a driving circuit if the signal is validated. The driving circuit enables power to a solenoid that closes the circuit breaker.

20 Claims, 4 Drawing Sheets

CIRCUIT BREAKER CLOSING ACTUATOR AND METHOD OF OPERATION

BACKGROUND

The present invention relates to a circuit breaker and particularly relates to a circuit breaker capable of being closed from a remote location.

Circuit breakers are electrical distribution devices that are installed to control the flow of electrical current from a power source to an electrical circuit. Circuit breakers are usually arranged to detect undesirable conditions in the electrical circuit, such as a short circuit or an elevated current level for example. In the event an undesirable condition is detected, the circuit breaker trips, or halts the flow of electrical current, to prevent the undesired condition from damaging the wiring of the electrical circuit.

After the undesired condition has been corrected, the operator or electrician needs to go to each circuit breaker that tripped and manually reset the circuit breaker to allow current to once again flow into the electrical circuit. The circuit breaker typically includes a mechanism that includes springs for closing the circuit breaker. Depending on the type of circuit breaker involved, the mechanism may be activated by a lever, or through the charging of closing springs that are subsequently released through an activation button.

In large facilities, such as a processing plant for example, there may be many circuit breakers that need to be reset. These circuit breakers may also be spread out over a wide area. As a result, the process of resetting the circuit breakers may take a long period of time as electricians visit each of the circuit breakers and perform the necessary reset actions. To resolve this, accessories that allow remote operation circuit breakers have been proposed. These accessories have separate control functionality from the circuit breaker which requires the installation of an additional communications conduit between the circuit breaker and a control center. This need for a separate communications conduit tends to make the installation of the remote operation accessory complicated and expensive. This is especially true when the accessory is installed after the circuit breaker has already been installed.

Accordingly, while present circuit breakers are suitable for their intended purposes, there is a need in the art for a circuit breaker that may be easily connected to a remote station without needing a separate communications conduit.

BRIEF DESCRIPTION OF THE INVENTION

A circuit breaker is provided having a trip unit with an external communications device. The trip unit includes a first processor responsive to executable computer instructions when executed on the first processor for generating a first signal in response to a second signal being received by the external communications device. A mechanism is operably coupled to the trip unit. A solenoid is operably coupled to the mechanism. A controller is electrically coupled between the trip unit and the solenoid, the controller includes a second processor responsive to executable computer instructions when executed on the second processor for enabling current to the solenoid in response to the first signal being received from said trip unit.

A remotely commanded circuit breaker closing actuator for use with a circuit breaker having a trip unit that is configured to communicate with an external device is also provided. The closing actuator includes a solenoid. A power supply circuit is electrically coupled to the solenoid. A controller is electrically coupled to the solenoid. A remote command circuit is electrically coupled between the trip unit and the controller. A driver circuit is electrically coupled between the controller and the solenoid. The controller also includes a processor responsive to executable computer instructions when executed on the processor for enabling current to the solenoid with the driver circuit and closing the circuit breaker in response to a first signal being received from the remote command circuit.

A method of remotely operating a circuit breaker is also provided. The method includes the step of transmitting a first signal from a remote station. The first signal is received in trip unit. A second signal is transmitted to a closing actuator. It is determined if the second signal satisfies a first threshold and a second threshold. A MOSFET device is activated if the second signal satisfies the first threshold and a second threshold. Electrical current is provided to a solenoid in response to the MOSFET device being activated.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
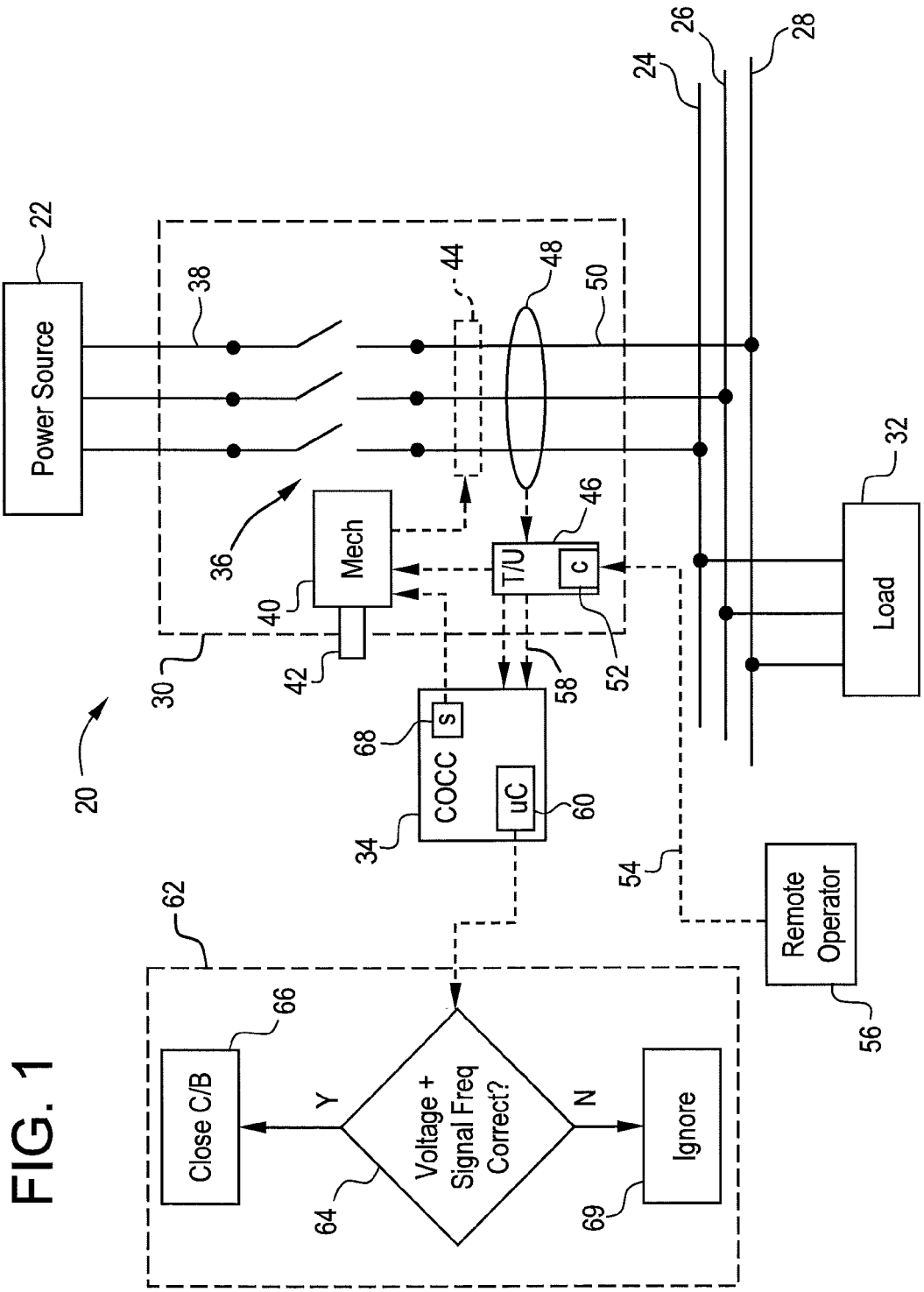
FIG. 1 is schematic view of an electrical circuit having a circuit breaker with a remote operated closing actuator in accordance with an exemplary embodiment.

Electrical systems typically incorporate various electrical distribution and control devices that allow the effective and efficient operation of the electrical circuit. FIG. 1 shows an exemplary electrical circuit 20 with a power source 22, which provides 3-phase electrical power A, B, C to three respective buses 24, 26, 28 protected by a signal controllable circuit breaker 30. Power is provided via the buses to one or more loads 32.

The circuit breaker 30 is generally arranged to open, or "trip", under abnormal operating conditions, such as a short circuit for example. After the abnormal condition has been cleared or corrected, the circuit breaker 30 is reset and electrical current flows once again to the load 32. As will be discussed in more detail below, a command operated close coil closing actuator 34 may be used to allow the operator to reclose the circuit breaker 30 from a remote location to avoid the dispatching of personnel to the circuit breaker location.

The circuit breaker 30 further includes one or more contact arms 36 that are arranged to move between an closed state, where current flows from the power source 22 to the load 32, and an open state where the flow of electrical power is interrupted. The contact arms 36 are electrically coupled to an inlet terminal 38 that electrically connects the circuit breaker 30 to the power source 22. The contact arms 36 are further coupled to a mechanism 40 that includes components such as springs and linkages to move the contact arms 36 from a closed to an open position when activated by an operator through an opening push button or handle 42 for example. The mechanism 40 may also include a closing latch (not shown) that allows the discharge of closing springs (not shown) to allow the contact arms 36 to close as is known in the art. The mechanism further uses a trip bar assembly 44 that allows the contact arms 36 to be opened quickly in the event of an abnormal operating condition. An outlet terminal 50 couples the circuit breaker 30 to the busses 24, 26, 28.

The mechanism 40 is also coupled to a trip unit 46. The trip unit 46 may be electronic, having a controller with a processor that executes computer instructions for controlling the operation of the circuit breaker 30. The trip unit 46 may also be a mechanical assembly incorporating components such as magnets or thermally responsive devices that activate the trip bar assembly 44 in the event of an abnormal operating condition. Where the trip unit 46 is an electronic unit, a set of current transformers 48 are positioned adjacent to the outlet terminal 50 to provide a signal indicative of the current level flowing through the circuit breaker 30 into the busses 24, 26, 28.

The trip unit 46 further includes a communications circuitry or device 52. The communications device 52 connects the trip unit 46 to a communications conduit 54. The communications conduit 54 provides a connection for signals and data to be passed between the circuit breaker 30 and a remote station 56. Such data and signals may include information, such as but not limited to, circuit breaker status, measured electrical characteristics and error codes for example. The communications conduit 54 may be any suitable communications that includes, but is not limited to, wired, wireless, radio and optical signal transmission systems. The communications device 52 is configured to communicate with remote station 56 using well-known computer communications protocols such as TCP/IP (Transmission Control Protocol/Internet Protocol), Ethernet, IEEE 802.11, RS-232, Mod-Bus, and the like.

A closing actuator 34 is coupled to the trip unit 46 and mechanism 40. In the exemplary embodiment, the closing actuator 34 is coupled to the trip unit 46 by a pair of conduits 58 that allow the transmission of signals. The signals are received by a controller 60 having a processor that is responsive to executable computer instructions. In one embodiment, the processor executes computer instructions represented by method 62. The method 62 queries the signal received from the trip unit 46 in block 64. If the voltage and frequency of the signal received from the trip unit 46 meet certain thresholds, the method 62 proceeds to block 66 that closes the circuit breaker 30. In the exemplary embodiment, the circuit breaker is closed by energizing a solenoid 68. The solenoid 68 activates the closing latch in the mechanism 40 releasing stored energy in the closing springs and causing the contact arms 36 to close, whereupon current will once again flow to the load 32. If the signal does not meet the desired thresholds, then the method 62 ignores the signal in block 69 and awaits a new signal.

Figure 2:
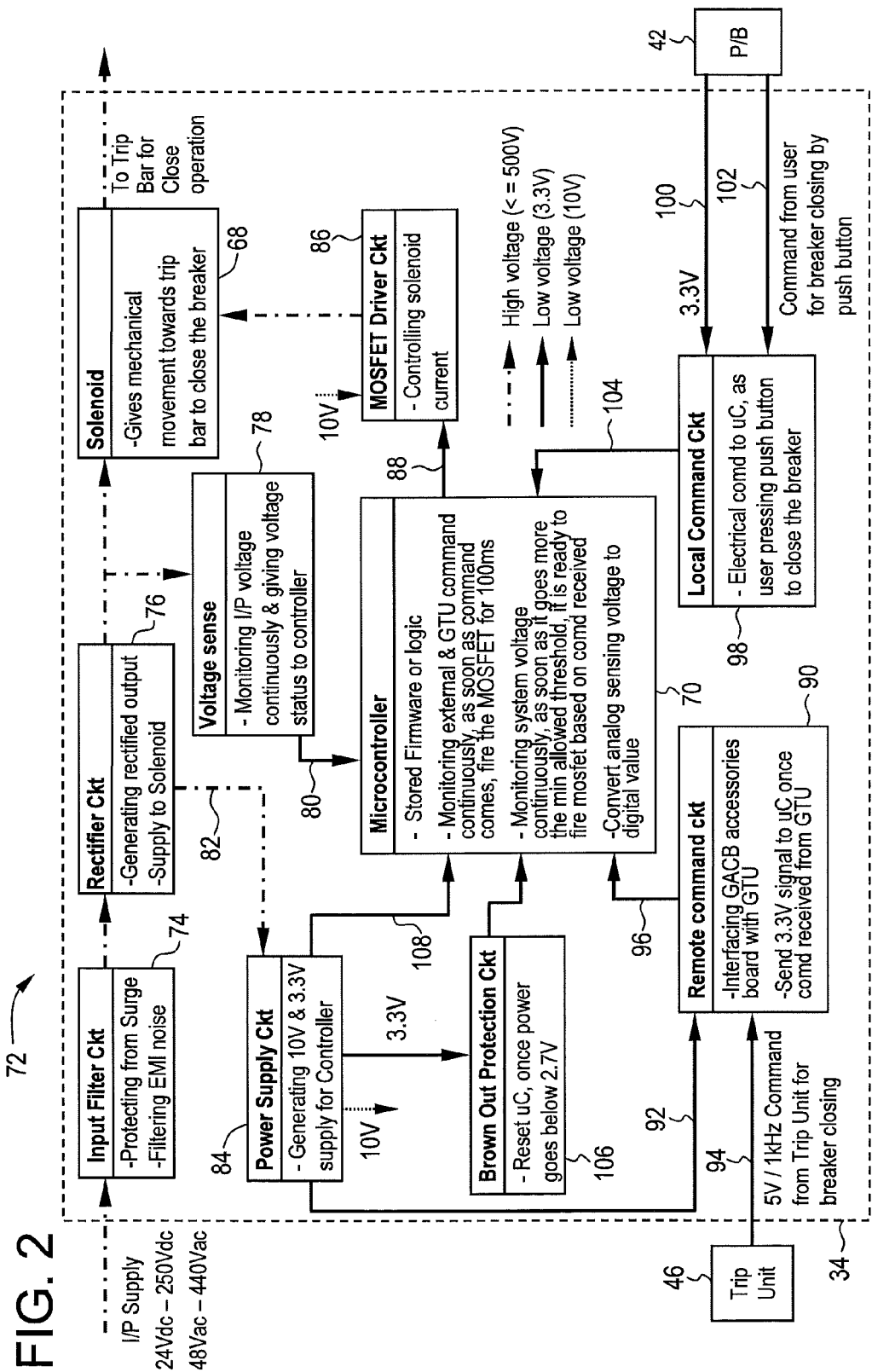
FIG. 2 is a block diagram of the remote operated closing actuator of FIG. 1.

Turning now to FIG. 2, another embodiment of the closing actuator 34 is illustrated. The closing actuator 34 includes a micro-controller 70. The micro-controller 70 is a suitable electronic device capable of accepting data and instructions, executing the instructions to process the data, and presenting the results. Micro-controller 70 may accept instructions through user interface, or through other means such as but not limited to electronic data card, voice activation means, manually operable selection and control means, radiated wavelength and electronic or electrical transfer. Therefore, micro-controller 70 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a solid-state computer, a single-board computer, or a hybrid of any of the foregoing.

Figure 3:
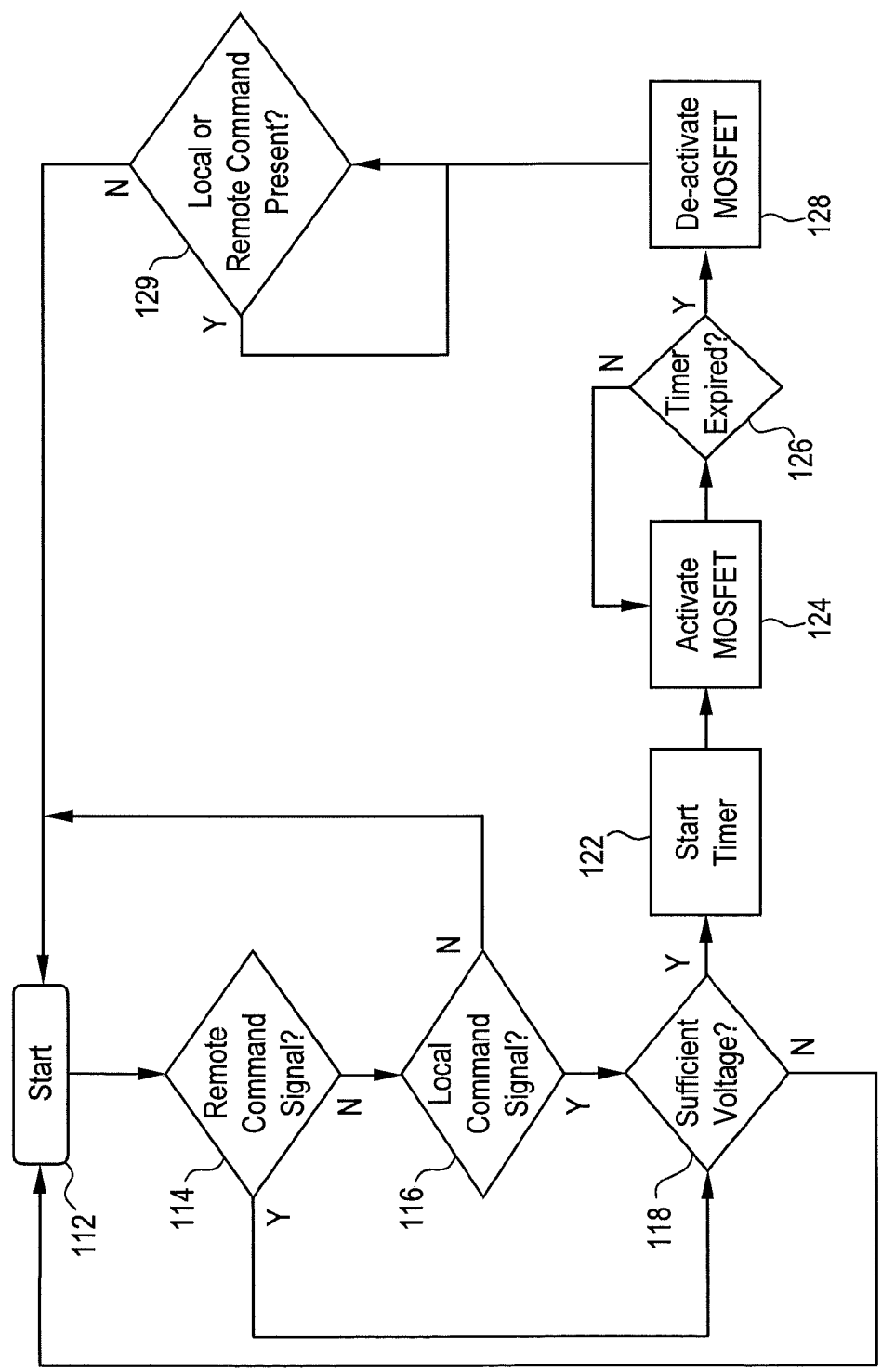
FIG. 3 is a flowchart of a method of remotely operating a circuit breaker in accordance with an exemplary embodiment; and, FIG. 4 is a flowchart of another method of remotely operating a circuit breaker.
Figure 4:
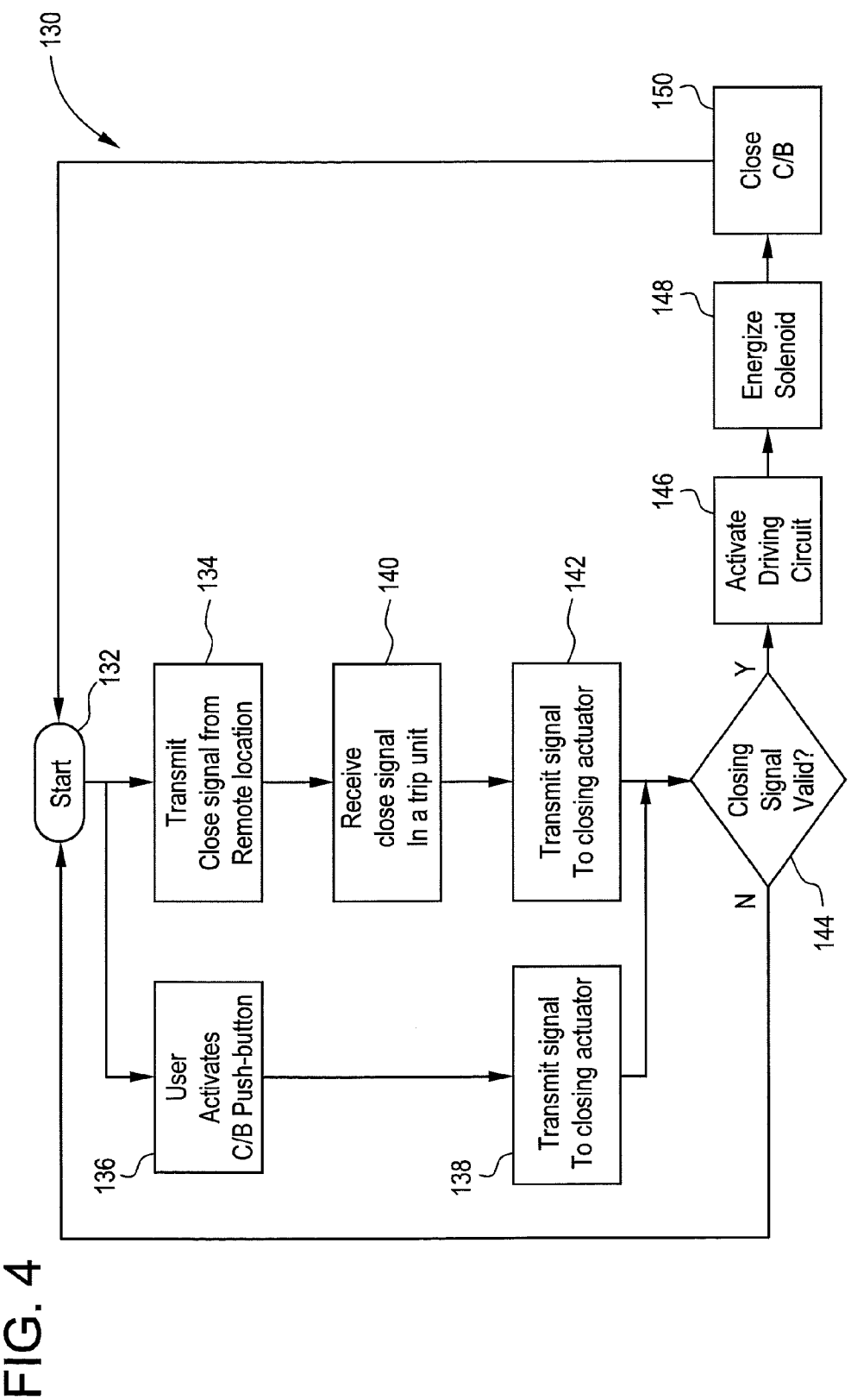

Micro-controller 70 is arranged to receive a plurality of inputs and transmits a plurality of outputs from and to circuits and devices operably coupled to the closing actuator 34. Micro-controller 70 includes operation control methods embodied in application code, such as are shown in FIG. 3 and FIG. 4 for example, that utilize the plurality of inputs to determine an appropriate response or action. These responses are then transmitted to the connected circuits to achieve the desired results. These methods are embodied in computer instructions written to be executed by a processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Closing actuator 34 includes a variety of circuits and devices for carrying out the instructions of micro-controller 70. A power circuit 72, for example, receives high voltage electrical power from an external source. The power circuit 72 includes several sub-circuits, such as but not limited to, an input filter 74, a rectifier circuit 76, and a voltage sensor 78. The power circuit 72 conditions the received high voltage electrical power and conditions the electrical power for use by the solenoid 68. The voltage sensor 78 monitors the voltage output by the rectifier circuit 76 and outputs a signal 80 representing this voltage, which then becomes an input to the micro-controller 70. The rectifier circuit 76 also includes a second output 82 that outputs high voltage electrical power to an internal power supply 84. The power supply 84 further conditions and distributes electrical power to the sub-circuits and micro-controller 70 of the closing actuator 34.

The controlling of current to the solenoid 68 is performed by a driver circuit 86. In the exemplary embodiment, the driver circuit 86 is a metal oxide semiconductor field-effect transistor (MOSFET) capable of controlling the flow of high levels of electrical power. As will be discussed in more detail below, the driver circuit 86 initiates and halts the flow of electrical power to the solenoid 68 in response a signal 88 from the micro-controller 70. As discussed above, when the driver circuit 86 initiates the flow of electrical power to the solenoid 68, the solenoid 68 engages a closing latch causing energy from closing springs to be released resulting in the closing of the circuit breaker contact arms 36.

A remote command circuit 90 provides an interface between the micro-controller 70 and the trip unit 46. The remote command circuit 90 includes a first input 92 from power supply circuit 84 and a second input 94 from the trip unit 46. The first input is a 3.3V signal to enable components of the remote command circuit 90, such as an optocoupler integrated circuit for example. The second input 94 provides a communications conduit between the trip unit 46 and the remote command circuit 90. In response to receiving a command to close circuit breaker 30 from remote station 56, the trip unit 46 transmits a close command signal at a desired voltage and frequency to the remote command circuit 90 via input 94. In the exemplary embodiment, the close command signal is a signal at 5 volts at 1000 hertz. The frequency of the signal is chosen to avoid interference with the surrounding environment. The voltage may be chosen based on selected components that are used within the remote command circuit, such as the driving voltage for an optocoupler for example.

The remote command circuit receives the signal 94 from the trip unit 46 and validates the signal 94 against the desired closing command parameters. If the signal 94 matches the desired parameters, such as 5V at 1000 Hertz for example, the remote command circuit 90 transmits a signal 96 to the micro-controller 70. As will be discussed below, the micro-controller 70 executes operational methods in response to the signal 96 that results in the activation of solenoid 68 and the closing of the circuit breaker.

In one embodiment, the closing actuator 34 also includes a local command circuit 98 that interfaces the micro-controller 70 with a circuit breaker user interface, such as push-button 42 for example. Similar to the remote command circuit 90, the local command circuit 98 includes a first input 100 and a second input 102 that are electrically coupled to the push-button 42. In response to an operator activating the push-button 42, a close signal in the form of NO (normally open) to NC (normally close) is transmitted via the second input 102. As soon as local command circuit 98 receives a NC signal via push-button 42, the local command circuit 98 transmits a signal 104 to the micro-controller 70. As above, the micro-controller 70 executes operational methods in response to the signal 104 that results in the activation of solenoid 68 and the closing of the circuit breaker 30. It should be appreciated that the local command signal functionality provides additional advantages in a controlling the closing of the circuit breaker. For example, additional logic or tests may be incorporated in the micro-controller 70 to only allow the closing of the circuit breaker 30 via the push-button 42 under certain circumstances. In one embodiment, the micro-controller 70 only activates the driving circuit 86 to energize the solenoid 68 when a command signal is received from the remote station 56 and the push-button 42.

The closing actuator 34 may include additional circuits for providing desired functionality. For example, the closing actuator 34 may include a brownout protection circuit 106. The brownout protection circuit 106 monitors the voltage being output by the power supply 84. In the event that the voltage falls below a desired threshold, such as 2.7V for example, a reset signal 108 is transmitted to the micro-controller 70. The reset signal 108 causes the micro-controller 70 to reset and re-initiate operation. It should be appreciated that the closing actuator 34 may include one or more of such circuits without deviating from the scope of the claimed invention.

The micro-controller 70 executes operation control method 110 embodied in application code such as illustrated in FIG. 3. The method 110 starts in block 112 and determines in query block 114 whether a remote command signal has been received, such as when a 5 volt, 1000 Hertz signal 94 is received for example. If query block 114 returns a negative, the method 110 proceeds to query block 116 and determines if a local command signal, such as NC (normally close) signal 104 for example, has been received. If query block 116 returns a negative, then the method 110 loops back to start block 112.

If either query block 114 or query block 116 return a positive, meaning that a remote command signal, or a local command signal has been received, then the method 110 proceeds to query block 118 where it is determined whether there is sufficient available voltage to operate the solenoid 68. The available voltage is measured by sensor 78 for example. If there is insufficient voltage, then the method 110 loops back to start operation 112 and repeats the previous steps of method 110. When query block 118 returns a positive, the method 110 moves to timer block 122 where a timer is started. In the exemplary embodiment, the timer is set to 100 milliseconds. The MOSFET driving circuit 86 is then activated in block 124. This causes the solenoid 68 to be energized causing the circuit breaker 30 to mechanism to release the closing springs, resulting in the closing of the contact arms 36.

Query block 126 checks to see if the timer has expired. If query block 126 returns a negative, the method 110 loops back to block 124 and maintains the MOSFET driving circuit 86 in an activated state (e.g. solenoid 68 is energized). When query block 126 returns a positive, such as after 100 milliseconds for example, then the method 110 proceeds to deactivate block 128 where the MOSFET driving circuit 86 and the solenoid 68 is deenergized.

The method 110 then proceeds to query block 129 where it is determined whether a remote command signal or local command signal is still present. If query block 129 returns an affirmative, meaning that the local or remote command is still being received, then the method 110 loops back to the input of the query block 129. Query block 129 prevents the repeated reclosing of the circuit breaker into a fault and thus allows only a single reclosing per command signal. Once the command signal ceases, the method 110 then loops back to start block 112 and begins the process again.

Another method of remotely operating a circuit breaker is illustrated in FIG. 4. In this embodiment, the method 130 begins in start block 132. The process bifurcates into two parallel processes depending on whether the command to close the circuit breaker is issued by an operator at a remote location as in block 134, such as remote station 56 for example, or if the command is issued locally in block 136 by an operator using the circuit breaker user interface to close the contact arms, such as by the push-button 42 for example. If the command is local, the method 130 proceeds to block 138 where a signal is transmitted to the closing actuator 34.

If the close signal was transmitted from a remote location in block 134, the method 130 proceeds to block 140 where the close signal is received by the trip unit 46. The trip unit 46 receives the close signal and passes a close command signal to the close actuator 34 in block 142. Once the close command signal has been transmitted to the close actuator 34 in block 138 or block 142, the method 130 proceeds to query block 144. Query block 144 determines if the signal received by the closing actuator 34 is valid. In the exemplary embodiment, query block 144 validates the voltage and frequency of the closing command signal to determine if the parameters match those of the desired voltage and frequency. If query block 144 returns a negative, meaning that the parameters do not match the desired parameters, then the method 130 loops back to start block 132.

If the close signal is valid, query block 144 returns a positive and proceeds to block 146 where the driving circuit, such as MOSFET driving circuit 38 for example, is activated. The activation of the driving circuit causes the solenoid to be energized in block 148. The energizing of the solenoid releases the circuit breaker closing latch that allows the closing springs to move the contact arms 36 to the closed position in block 150. Once the circuit breaker is closed, the method 130 loops back to start block 132 and the process starts again.

It should be appreciated that a circuit breaker 30 having a closing actuator 34 provides a number of advantages. The closing actuator 34 allows the installation of the closing actuator 34 after the initial circuit breaker installation with minimal cost since the closing actuator 34 uses the circuit breaker trip unit's communications capability to avoid needing a separate communications conduit. The closing actuator further allows the functionality of closing of the circuit breaker to be performed by the closing actuator rather than the internal circuit breaker mechanism, allowing a greater degree of control.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), non-volatile memory (NVM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to allow the closing of a circuit breaker from a location that is remote from the circuit breaker.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A circuit breaker comprising:
   a trip unit having an external communications device, said trip unit including a first processor responsive to executable computer instructions when executed on said first processor for generating a first signal in response to a second signal being received by said external communications device;
   a mechanism operably coupled to said trip unit;
   a solenoid operably coupled to said mechanism; and
   a controller electrically coupled between said trip unit and said solenoid, said controller including a second processor responsive to executable computer instructions when executed on said second processor for enabling current to said solenoid in response to said first signal being received from said trip unit.

2. The circuit breaker of claim 1 wherein said second processor is further responsive to executable computer instructions when executed on said second processor for controlling said current to said solenoid in response to receiving a third signal.

3. The circuit breaker of claim 2 further comprising a user interface electrically coupled to said controller, said user interface generating said third signal in response to a user activating said user interface.

4. The circuit breaker of claim 1 wherein said controller further includes a MOSFET drive circuit electrically coupled between said processor and said solenoid, wherein said MOSFET drive circuit controls current to said solenoid.

5. The circuit breaker of claim 4 wherein said second processor transmits a fourth signal to said MOSFET driver in response to said first signal being received from said trip unit.

6. The circuit breaker of claim 5 wherein said first signal includes a voltage level parameter and a frequency parameter.

7. The circuit breaker of claim 6 wherein said second processor transmits said fourth signal in response to said voltage level parameter satisfying a first threshold and said frequency parameter satisfying a second threshold.

8. The circuit breaker of claim 7 wherein said second threshold is a frequency of 1 KHz.

9. The circuit breaker of claim 8 wherein said second processor is further responsive to executable computer instructions when executed on said second processor for enabling aid current to said solenoid for a predetermined amount of time.

10. A remotely commanded circuit breaker closing actuator for use with a circuit breaker having a trip unit that is configured to communicate with an external device, said closing actuator comprising:
    a solenoid;
    a power supply circuit electrically coupled to said solenoid;
    a controller electrically coupled to said solenoid;
    a remote command circuit electrically coupled between said trip unit and said controller; and,
    a driver circuit electrically coupled between said controller and said solenoid;
    wherein said controller includes a processor responsive to executable computer instructions when executed on said processor for enabling current to said solenoid with said driver circuit and closing said circuit breaker in response to a first signal being received from said remote command circuit.

11. The closing actuator of claim 10 further comprising a local command circuit electrically coupled to said controller, wherein said processor is further responsive to executable computer instructions when executed on said processor for enabling current to said solenoid in response to a second signal being received by said local command circuit.

12. The closing actuator of claim 11 wherein said second processor enables current to said solenoid with said driver circuit for a predetermined amount of time.

13. The closing actuator of claim 12 wherein said remote command circuit transmits a third signal to said controller in response to receiving a command signal from said trip unit.

14. The closing actuator of claim 13 wherein said command signal includes a voltage level parameter and a frequency parameter, and wherein said remote command circuit transmits said third signal in response to said voltage level parameter satisfying a first threshold and said frequency parameter satisfying a second threshold.

15. The closing actuator of claim 14 wherein said second threshold is a frequency of 1 kHz.

16. A method of remotely operating a circuit breaker comprising:
    transmitting a first signal from a remote station;
    receiving said first signal in trip unit;
    transmitting a second signal to a closing actuator;
    determining if said second signal satisfies a first threshold and a second threshold;
    activating a MOSFET device if said second signal satisfies said first threshold and a second threshold;
    providing electric current to a solenoid in response to said MOSFET device being activated.

17. The method of claim 16 further comprising the step of closing said circuit breaker in response to providing current to said solenoid.

18. The method of claim 17 wherein said MOSFET device is activated for a predetermined amount of time.

19. The method of claim 18 further comprising the step of transmitting a third signal in response to a user activating a close button.

20. The method of claim 19 further comprising the step of activating said MOSFET device for said predetermined amount of time in response to said third signal being transmitted.

* * * * *